USO11084464B2

(12) United States Patent
Velasco et al.

(10) Patent No.: US 11,084,464 B2
(45) Date of Patent: Aug. 10, 2021

(54) SENSOR-CLEANING APPARATUS

(71) Applicant: Ford Global Technologies, LLC, Dearborn, MI (US)

(72) Inventors: Jose Gerardo Velasco, Mexico City (MX); Oswaldo Perez Barrera, Estado de Mexico (MX); David Franco Lopez Rubio, Estado de Mexico (MX); Rodrigo Frieventh Cienfuegos, Estado de Mexico (MX)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 331 days.

(21) Appl. No.: 16/242,600

(22) Filed: Jan. 8, 2019

(65) Prior Publication Data

US 2020/0216034 A1 Jul. 9, 2020

(51) Int. Cl.
| | |
|---|---|
| *B60S 1/08* | (2006.01) |
| *B60S 1/56* | (2006.01) |
| *B60S 1/54* | (2006.01) |
| *G01S 7/497* | (2006.01) |
| *B60S 1/48* | (2006.01) |
| *G01S 7/481* | (2006.01) |
| *G02B 27/00* | (2006.01) |

(52) U.S. Cl.
CPC ........... *B60S 1/0896* (2013.01); *B60S 1/486* (2013.01); *B60S 1/542* (2013.01); *B60S 1/566* (2013.01); *G01S 7/4813* (2013.01); *G01S 7/497* (2013.01); *G01S 2007/4977* (2013.01); *G02B 27/0006* (2013.01)

(58) Field of Classification Search
CPC ........ B60S 1/0848; B60S 1/524; B60S 1/546; B60S 1/548; B60S 1/38; B60S 2001/3836; B60S 2001/3827; B60S 1/486; B60S 1/542; B60S 1/566; B60S 1/0896; G02B 27/0006; G01S 7/497; G01S 2007/4977
USPC ........... 15/250.01, 250.001, 250.04, 250.48, 15/250.29, 301
See application file for complete search history.

(56) References Cited

U.S. PATENT DOCUMENTS

| | | | |
|---|---|---|---|
| 2,883,693 A * | 4/1959 | Leathers | ................. E21B 33/08 15/220.4 |
| 9,731,688 B2 | 8/2017 | Doorley et al. | |
| 10,259,431 B1 * | 4/2019 | Ybarra | ....................... B60S 1/66 |
| 2015/0185592 A1 * | 7/2015 | Eineren | .............. G02B 27/0006 348/375 |
| 2017/0225654 A1 * | 8/2017 | de Almeida | .......... B60S 1/0402 |
| 2017/0259789 A1 | 9/2017 | McAndrew | |
| 2018/0009418 A1 | 1/2018 | Newman | |
| 2018/0170319 A1 | 6/2018 | Schmidt | |

(Continued)

FOREIGN PATENT DOCUMENTS

| | | |
|---|---|---|
| CN | 107499285 A | 12/2017 |
| DE | 102016008064 A1 | 12/2016 |

*Primary Examiner* — Gary K. Graham
*Assistant Examiner* — Thomas Raymond Rodgers
(74) *Attorney, Agent, or Firm* — Frank A. MacKenzie; Bejin Bieneman PLC (57) ABSTRACT

An apparatus includes a base, a cylindrical sensor window fixed to the base, and a helical cleaning member movable between a retracted position in the base and an extended position extending around the sensor window. The cleaning member includes an outlet directed at the sensor window when the cleaning member is in the extended position.

19 Claims, 7 Drawing Sheets

(56) References Cited

U.S. PATENT DOCUMENTS

| | | |
|---|---|---|
| 2018/0265048 A1 | 9/2018 | Schmidt |
| 2020/0023815 A1* | 1/2020 | Galera ................. B60S 1/3404 |

* cited by examiner

SENSOR-CLEANING APPARATUS

BACKGROUND

Vehicles typically include sensors. The sensors can provide data about operation of the vehicle, for example, wheel speed, wheel orientation, and engine and transmission data (e.g., temperature, fuel consumption, etc.). The sensors can detect the location and/or orientation of the vehicle. The sensors can be global positioning system (GPS) sensors; accelerometers such as piezo-electric or microelectromechanical systems (MEMS); gyroscopes such as rate, ring laser, or fiber-optic gyroscopes; inertial measurements units (IMU); and/or magnetometers. The sensors can detect the external world, e.g., objects and/or characteristics of surroundings of the vehicle, such as other vehicles, road lane markings, traffic lights and/or signs, pedestrians, etc. The sensors can be radar sensors, scanning laser range finders, light detection and ranging (LIDAR) devices, and/or image processing sensors such as cameras.

DETAILED DESCRIPTION

An apparatus includes a base, a cylindrical sensor window fixed to the base, and a helical cleaning member movable between a retracted position in the base and an extended position extending around the sensor window. The cleaning member includes an outlet directed at the sensor window when the cleaning member is in the extended position.

The cleaning member may include a plurality of outlets including the outlet, and the outlets may be directed at the sensor window when the cleaning member is in the extended position. The cleaning member may include a tube fluidly coupled to the outlets. The outlets may be first outlets, the tube may be a first tube, and the cleaning member may include a plurality of second outlets and a second tube fluidly coupled to the second outlets. The apparatus may further include a first pump fluidly coupled to the first tube, and a second pump fluidly coupled to the second tube. The apparatus may further include a controller communicatively coupled to the first pump and the second pump and programmed to activate the second pump while the cleaning member moves from the retracted position to the extended position. The controller may be further programmed to activate the first pump while the cleaning member moves from the extended position to the retracted position.

The cleaning member may include a plurality of third outlets and a third tube fluidly coupled to the third outlets, and the apparatus may further include an air source disposed in the base and fluidly coupled to the third tube. The air source may be one of a blower or a compressor.

The apparatus may further include a first reservoir fluidly coupled to the first tube and disposed in the base, and a second reservoir fluidly coupled to the second tube and disposed in the base.

The apparatus may further include a reservoir fluidly coupled to the tube and disposed in the base.

The cleaning member may have a helical shape of at least two complete revolutions.

The base may include a rail, and the cleaning member may be engaged with the rail while moving between the retracted position and the extended position. The rail may have a lead angle that is substantially equal to a lead angle of the cleaning member.

The apparatus may further include a motor drivably coupled to the cleaning member and disposed in the base. The apparatus may further include a controller communicatively coupled to the motor and programmed to prevent the motor from moving the cleaning member from the retracted position to the extended position while a vehicle is in motion.

The apparatus may further include a controller communicatively coupled to the motor and programmed to instruct the motor to move the cleaning member from the extended position to the retracted position in response to a vehicle gear shifting out of park.

The cleaning member may include a wiper blade directed radially inward, and the wiper blade may contact the sensor window when the cleaning member is in the extended position. The wiper blade may be elongated along the cleaning member.

With reference to the Figures, an apparatus 30 for a vehicle 32 includes a base 34, a cylindrical sensor window 36 fixed to the base 34, and a helical cleaning member 38 movable between a retracted position in the base 34 and an extended position extending around the sensor window 36. The cleaning member 38 includes at least one first outlet 40 directed at the sensor window 36 when the cleaning member 38 is in the extended position.

The apparatus 30 can clean the sensor window 36, which can improve the quality of data gathered by a sensor 42 having a field of view through the sensor window 36. The apparatus 30 can provide a thorough cleaning of the sensor window 36 while the vehicle 32 is stopped and keep out of the field of view of the sensor 42 while the vehicle 32 is in motion. The helical shape of the cleaning member 38 allows the apparatus 30 to clean an entirety of the cylindrical sensor window 36 without leaving dirty zones.

Figure 1:
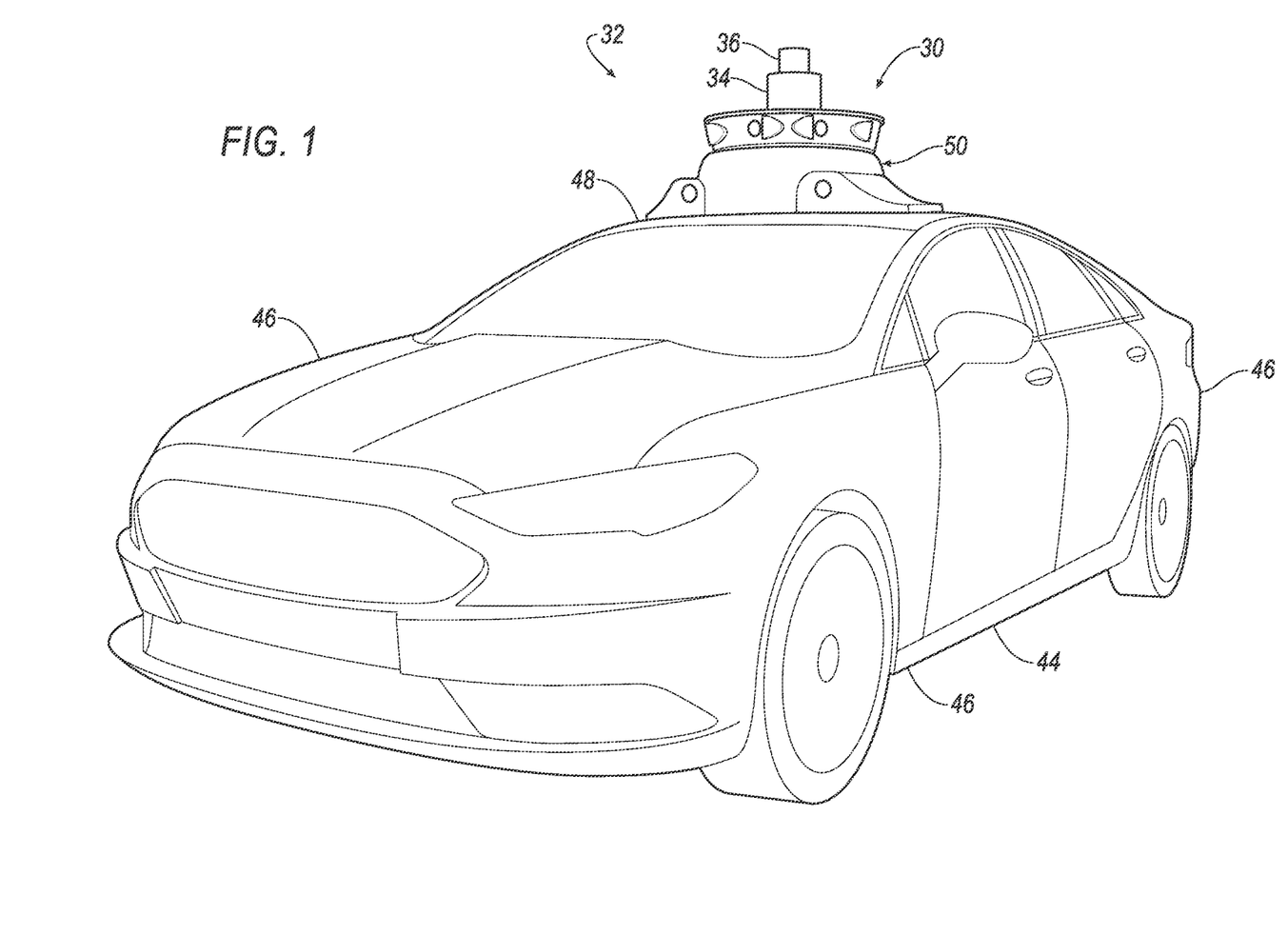
FIG. 1 is a perspective view of an example vehicle.

With reference to FIG. 1, the vehicle 32 may be any passenger or commercial automobile such as a car, a truck, a sport utility vehicle, a crossover, a van, a minivan, a taxi, a bus, etc.

The vehicle 32 may be an autonomous vehicle. A vehicle computer can be programmed to operate the vehicle 32 independently of the intervention of a human driver, completely or to a lesser degree. The vehicle computer may be programmed to operate the propulsion, brake system, steering, and/or other vehicle systems based on data received from a sensor 42, as well as other sensors. For the purposes of this disclosure, autonomous operation means the vehicle computer controls the propulsion, brake system, and steering without input from a human driver; semi-autonomous operation means the vehicle computer controls one or two of the propulsion, brake system, and steering and a human driver controls the remainder; and nonautonomous operation means a human driver controls the propulsion, brake system, and steering.

The vehicle 32 includes a body 44. The vehicle 32 may be of a unibody construction, in which a frame and the body 44 of the vehicle 32 are a single component. The vehicle 32 may, alternatively, be of a body-on-frame construction, in which the frame supports the body 44 that is a separate component from the frame. The frame and the body 44 may be formed of any suitable material, for example, steel, aluminum, etc. The body 44 includes body panels 46, 48 partially defining an exterior of the vehicle 32. The body panels 46, 48 may present a class-A surface, e.g., a finished surface exposed to view by a customer and free of unaesthetic blemishes and defects. The body panels 46, 48 include, e.g., a roof 48, etc.

A housing 50 for supporting the sensor 42 is attachable to the vehicle 32, e.g., to one of the body panels 46, 48 of the vehicle 32, e.g., the roof 48. For example, the housing 50 may be shaped to be attachable to the roof 48, e.g., may have a shape matching or following a contour of the roof 48. The housing 50 may be attached to the roof 48, which can provide the sensor 42 with an unobstructed field of view of an area around the vehicle 32. The housing 50 may be formed of, e.g., plastic or metal.

The base 34 may be mounted to the housing 50 or to one of the body panels 46, 48, e.g., the roof 48. The base 34 may extend upwardly from the housing 50, as shown in FIG. 1, or be partially or fully recessed inside the housing 50. The base 34 has a cylindrical shape oriented vertically, i.e., defining an axis A that is substantially vertical. A diameter of the base 34 is greater than a diameter of the cleaning member 38 and greater than a diameter of the sensor window 36. A height of the base 34 may be at least as great as a height of the cleaning member 38 and at least as great as a height of the sensor window 36.

Figure 2A:
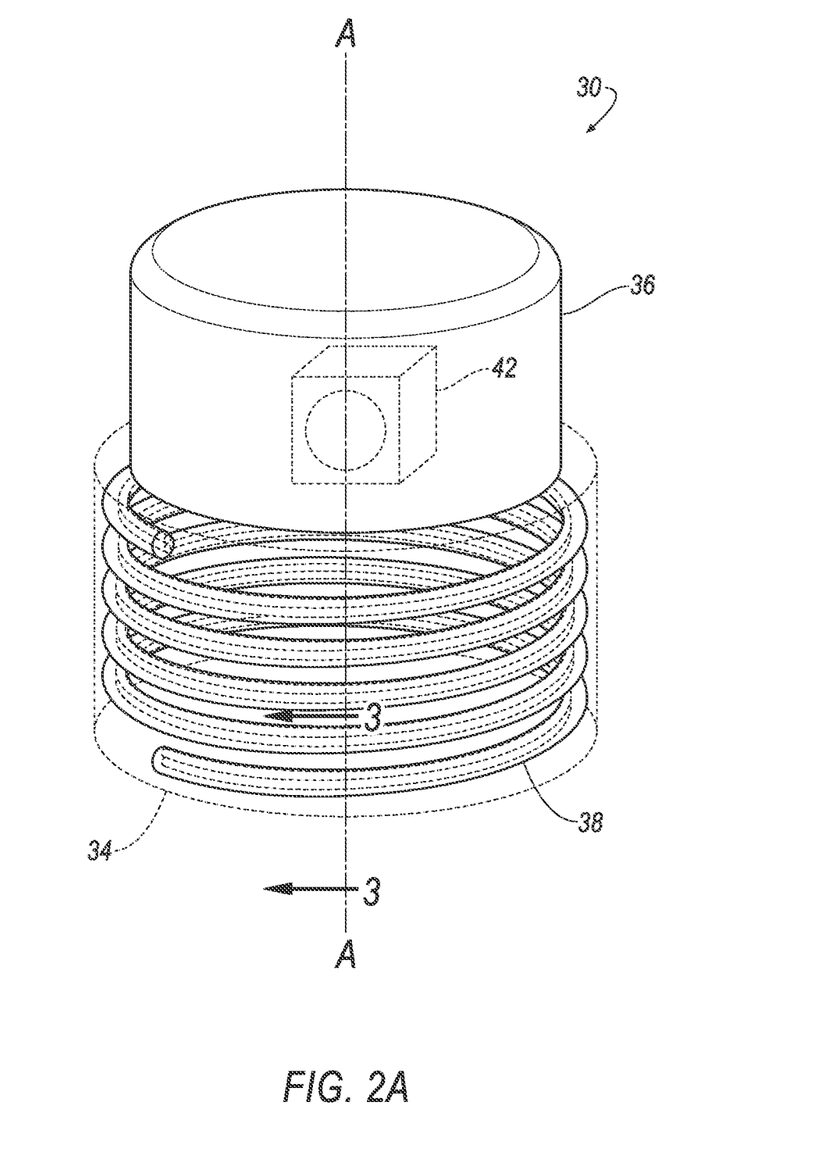
FIG. 2A is a perspective view of a sensor assembly of the vehicle with a cleaning member in a retracted position.

With reference to FIG. 2A, the sensor 42 can detect the external world, e.g., objects and/or characteristics of surroundings of the vehicle 32, such as other vehicles, road lane markings, traffic lights and/or signs, pedestrians, etc. For example, the sensor 42 may be a radar sensor, scanning laser range finder, light detection and ranging (LIDAR) device, or image processing sensor such as a camera. In particular, the sensor 42 can be a LIDAR device. A LIDAR device detects distances to objects by emitting laser pulses and measuring the time of flight for the pulse to travel to the object and back. The sensor 42 is mounted to the base 34 and disposed inside the sensor window 36.

The sensor window 36 is cylindrical and hollow. The sensor window 36 is centered on the base 34, i.e., the sensor window 36 defines the axis A. The sensor window 36 is fixed to the base 34. The sensor window 36 extends upward from the base 34. The sensor window 36 has an outer diameter less than or approximately equal to an inner diameter of the cleaning member 38. The sensor window 36 is transparent at least to, i.e., allows to substantially pass, a wavelength of light emitted by the sensor 42. The sensor 42 has a 360° horizontal field of view through the sensor window 36.

Figure 2B:
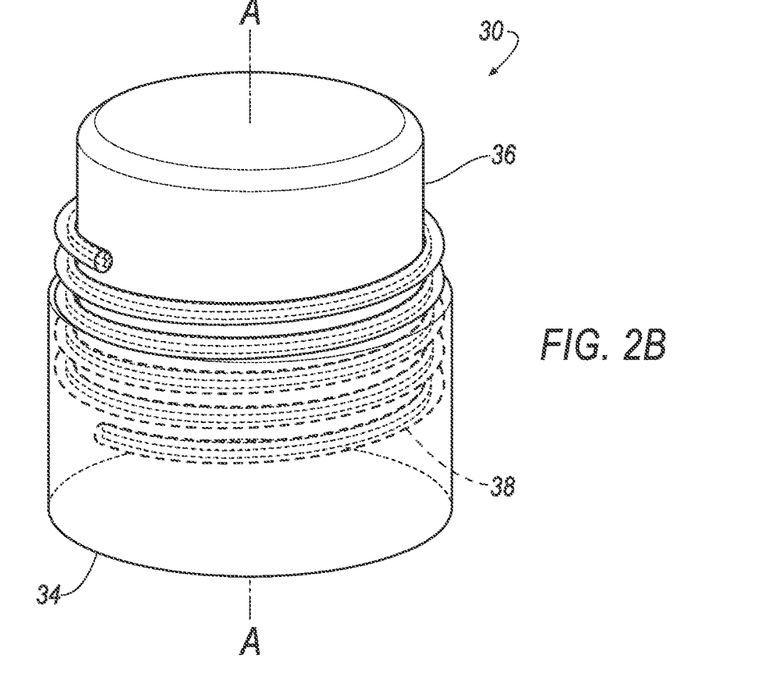
FIG. 2B is a perspective view of the sensor assembly with the cleaning member in a partially extended position.
Figure 2C:
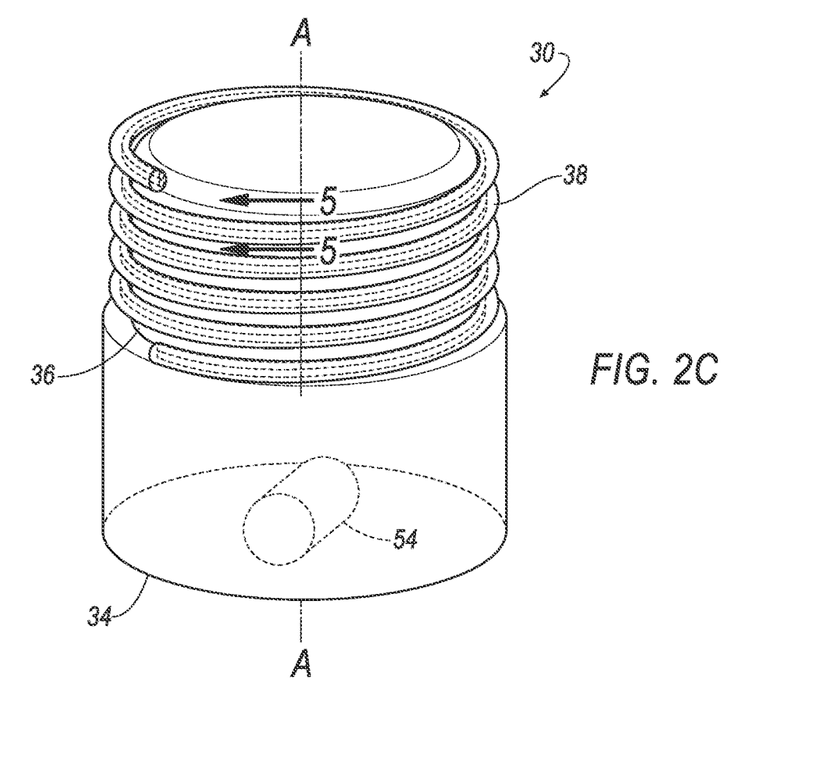
FIG. 2C is a perspective view of the sensor assembly with the cleaning member in an extended position.

With reference to FIGS. 2A-C, the cleaning member 38 forms a helix, i.e., an elongated shape following a curve that rotates around an axis while also advancing along the axis. More specifically, the cleaning member 38 forms a circular helix with a constant pitch, "circular" meaning the radius (i.e., perpendicular distance from the axis to the helix) is constant along the helix, and "pitch" meaning the axial distance between consecutive revolutions of the helix. The cleaning member 38 has a helical shape of at least two complete revolutions, i.e., the helical shape of the cleaning member 38 rotates at least 720° around the axis A. As shown in the Figures, the cleaning member 38 has five complete revolutions. A height, i.e., axial length, of the cleaning member 38 is no greater than a height of the base 34 and approximately equal to a height of the sensor window 36.

The cleaning member 38 is movable between a retracted position and an extended position. The cleaning member 38 in the retracted position is disposed in the base 34, as shown in FIG. 2A, and the base 34 conceals the cleaning member 38 in the retracted position. The cleaning member 38 in the extended position extends around the sensor window 36, as shown in FIG. 2C. The cleaning member 38 in the extended position has less than one revolution inside the base 34. The retracted position and the extended position define a range of motion of the cleaning member 38, and the retracted position and the extended position are as far apart as the cleaning member 38 can move. The cleaning member 38 can occupy positions intermediate to the retracted position and the extended position, as shown in FIG. 2B.

Figure 3:
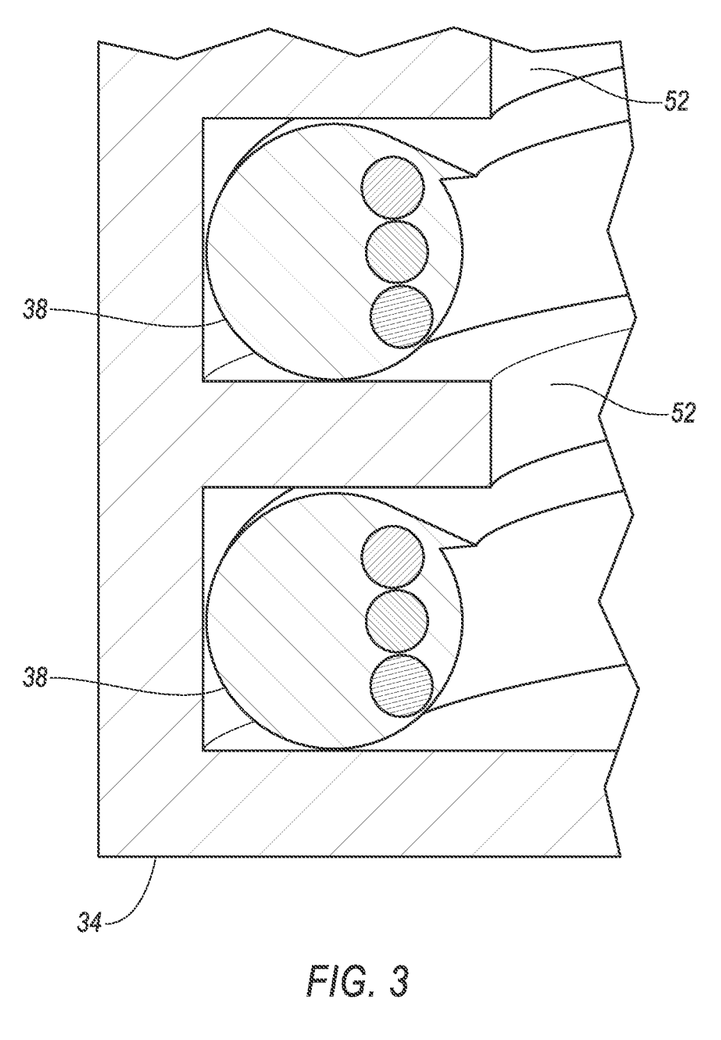
FIG. 3 is a cross-sectional view of a base of the sensor assembly along line 3-3 in FIG. 2A.

With reference to FIG. 3, the base 34 includes a rail 52. The rail 52 is positioned internally in the base 34. The rail 52 has a helical shape with a lead angle substantially equal to the lead angle of the cleaning member 38. For the purposes of this disclosure, "lead angle" is defined as the angle between a helix and the helix's plane of rotation, i.e., the plane orthogonal to the helix's axis. The cleaning member 38 moves between the retracted position and the extended position by sliding along the rail 52, and the cleaning member 38 is thus engaged with the rail 52 while moving between the retracted position and the extended position. The cross-sectional shape of the rail 52 may be a shelf or channel on which or in which the cleaning member 38 sits. The rail 52 can be integral with the base 34, i.e., formed as a single, continuous component with the base 34, or the rail 52 can be a separate component attached to the base 34 on an inside wall of the base 34.

Returning to FIG. 2C, alternatively or additionally, the apparatus 30 includes a motor 54 drivably coupled to the cleaning member 38. The motor 54 is disposed in the base 34. For example, the motor 54 may be positioned to drivably slide the cleaning member 38 in the rail 52 between the retracted position and the extended position, e.g., by rotating a wheel (not shown) frictionally contacting the cleaning member 38. For another example, the rail 52 may be absent, and the motor 54 may be positioned to slide the cleaning member 38 axially, i.e., straight vertically, e.g., by actuating a linear actuator (not shown) connected to the cleaning member 38.

Figure 4:
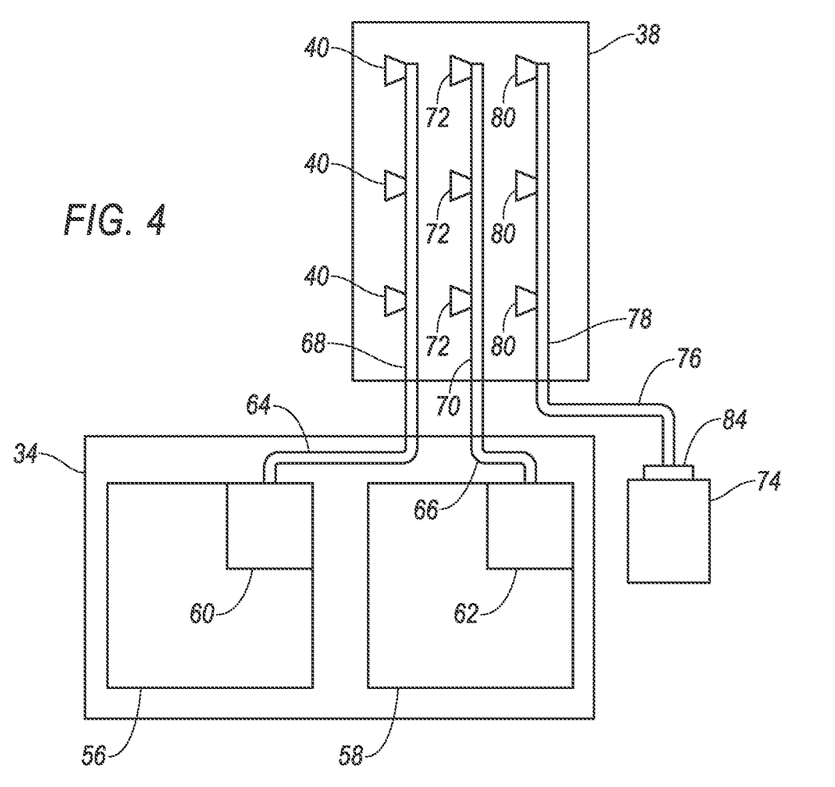
FIG. 4 is a diagram of a cleaning system of the sensor assembly.

With reference to FIG. 4, the apparatus 30 includes a first reservoir 56, a second reservoir 58, a first pump 60, a second pump 62, a first supply line 64, a second supply line 66, a first tube 68, a second tube 70, the first outlets 40, and second outlets 72. The first reservoir 56, first pump 60, and first outlets 40 are fluidly coupled to each other (i.e., fluid can flow from one to the other) via the first supply line 64 and the first tube 68. The second reservoir 58, second pump 62, and second outlets 72 are fluidly coupled to each other via the second supply line 66 and second tube 70. The first reservoir 56 and the second reservoir 58 are disposed in the base 34. The reservoirs 56, 58 are tanks fillable with liquid. Specifically, the first reservoir 56 can be filled with water, and the second reservoir 58 can be filled with detergent, possibly diluted with water and possibly including other additives such as solvents.

The first pump 60 can force the water through the first supply line 64 and the first tube 68 with sufficient pressure that the water sprays from the first outlets 40. The second pump 62 can force the detergent through the second supply line 66 and the second tube 70 with sufficient pressure that the detergent sprays from the second outlets 72. The first pump 60 is attached to or disposed in the first reservoir 56, and the second pump 62 is attached to or disposed in the second reservoir 58.

The first supply line 64 extends from the first pump 60 to the first tube 68, and the second supply line 66 extends from the second pump 62 to the second tube 70. The supply lines 64, 66 are flexible tubes that are sufficiently long to have slack regardless of whether the cleaning member 38 is in the retracted position or the extended position.

Figure 5:
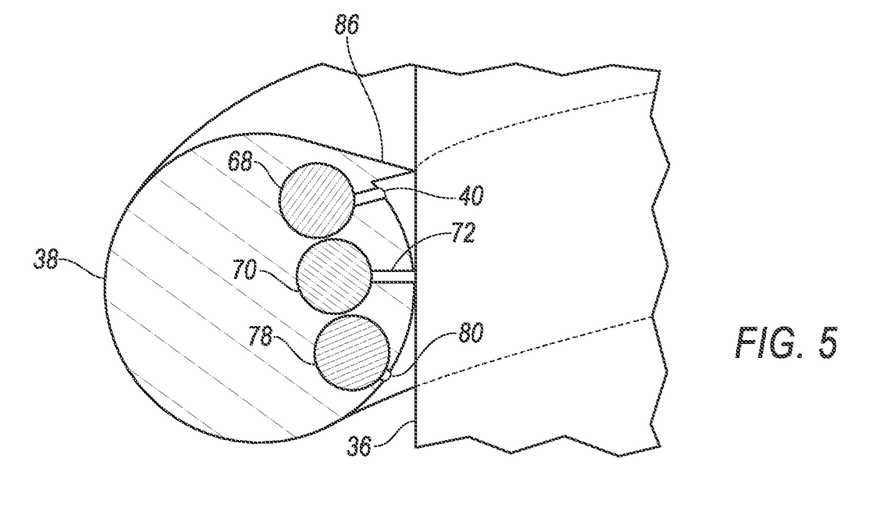
FIG. 5 is a cross-sectional view of the cleaning member along line 5-5 in FIG. 2C.

With reference to FIGS. 4 and 5, the cleaning member 38 includes the first tube 68 and the second tube 70. The tubes 68, 70 are disposed inside the cleaning member 38 and are elongated along the helical shape of the cleaning member 38. The first tube 68 is fluidly coupled in series to the first outlets 40, and the second tube 70 is fluidly coupled in series to the second outlets 72.

The cleaning member 38 includes the first outlets 40 and the second outlets 72. The first outlets 40 and the second outlets 72 are directed radially inwardly, i.e., positioned to eject liquid toward the axis A. The first outlets 40 and the second outlets 72 are directed at the sensor window 36 when the cleaning member 38 is in the extended position.

With reference to FIG. 4, the apparatus 30 includes an air source 74, an air supply line 76, a third tube 78, and third outlets 80. The air source 74 and the third outlets 80 are fluidly coupled to each other via the air supply line 76 and the third tube 78. The air source 74 can push air through the air supply line 76 and the third tube 78 to the third outlets 80. The air source 74 increases the pressure of a gas by reducing a volume of the gas or by forcing additional gas into a constant volume. The air source 74 is one of a blower or a compressor, e.g., any suitable type of compressor, e.g., a positive-displacement compressor such as a reciprocating, ionic liquid piston, rotary screw, rotary vane, rolling piston, scroll, or diaphragm compressor; a dynamic compressor such as an air bubble, centrifugal, diagonal, mixed-flow, or axial-flow compressor; or any other suitable type.

A heater 84 is positioned to heat air that flows through the air supply line 76. For example, the heater 84 may be a resistance heater, or the heater 84 may capture and redirect waste heat from other components of the vehicle 32. The air flowing through the third tube 78 and third outlets 80 is thus heated.

The air supply line 76 extends from the air source 74 to the third tube 78. The air supply line 76 is a flexible tube that is sufficiently long to have slack regardless of whether the cleaning member 38 is in the retracted position or the extended position.

With reference to FIGS. 4 and 5, the cleaning member 38 includes the third tube 78. The third tube 78 is disposed inside the cleaning member 38 and is elongated along the helical shape of the cleaning member 38. The third tube 78 is fluidly coupled in series to the third outlets 80.

The cleaning member 38 includes the third outlets 80. The third outlets 80 are directed radially inward, i.e., positioned to propel air toward the axis A. The third outlets 80 are directed at the sensor window 36 when the cleaning member 38 is in the extended position.

With reference to FIG. 5, the cleaning member 38 includes a wiper blade 86. The wiper blade 86 is elongated along the cleaning member 38 and follows the helical shape of the cleaning member 38. The wiper blade 86 is directed radially inwardly, i.e., tapering from the cleaning member 38 toward the axis A. The wiper blade 86 contacts the sensor window 36 when the cleaning member 38 is in the extended position. If, e.g., the motor 54 moves the cleaning member 38 axially between the retracted position and the extended position, the wiper blade 86 wipes the sensor window 36 up and down.

Figure 6:
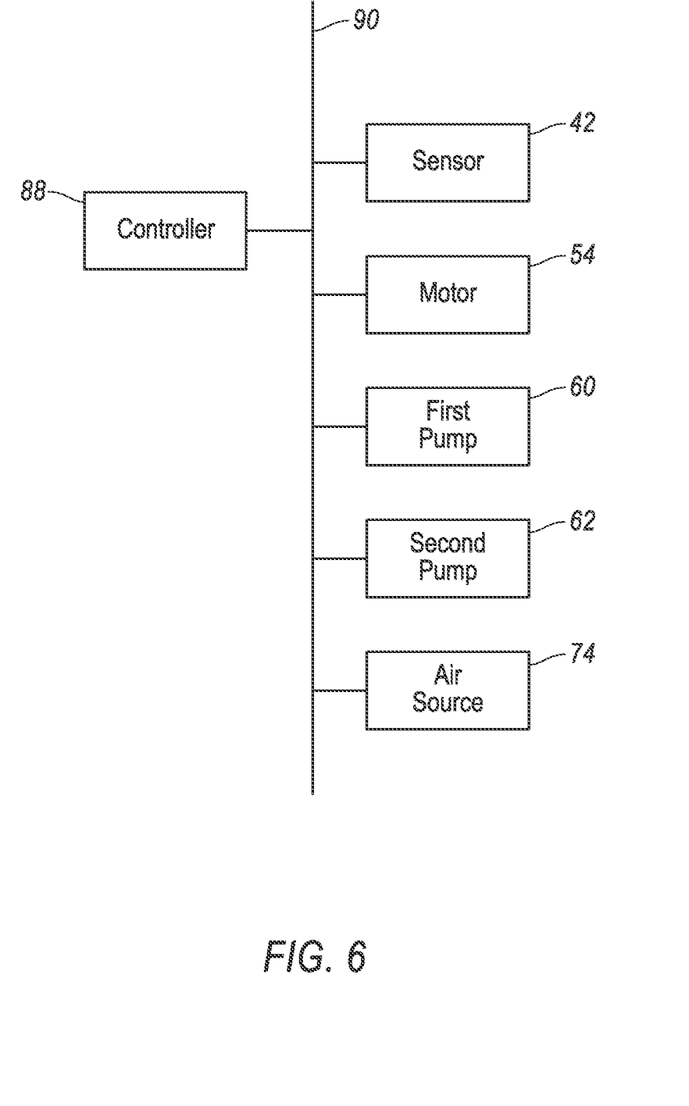
FIG. 6 is a block diagram of a control system for the cleaning system.

With reference to FIG. 6, the apparatus 30 includes a controller 88. The controller 88 is a microprocessor-based controller. The controller 88 includes a processor, a memory, etc. The memory of the controller 88 includes media for storing instructions executable by the processor as well as for electronically storing data and/or databases.

The controller 88 may transmit and receive data through a communications network 90 such as a controller area network (CAN) bus, Ethernet, WiFi, Local Interconnect Network (LIN), onboard diagnostics connector (OBD-II), and/or by any other wired or wireless communications network. The controller 88 may be communicatively coupled to the sensor 42, the motor 54, the first pump 60, the second pump 62, the air source 74, and other components via the communications network 90.

Figure 7:
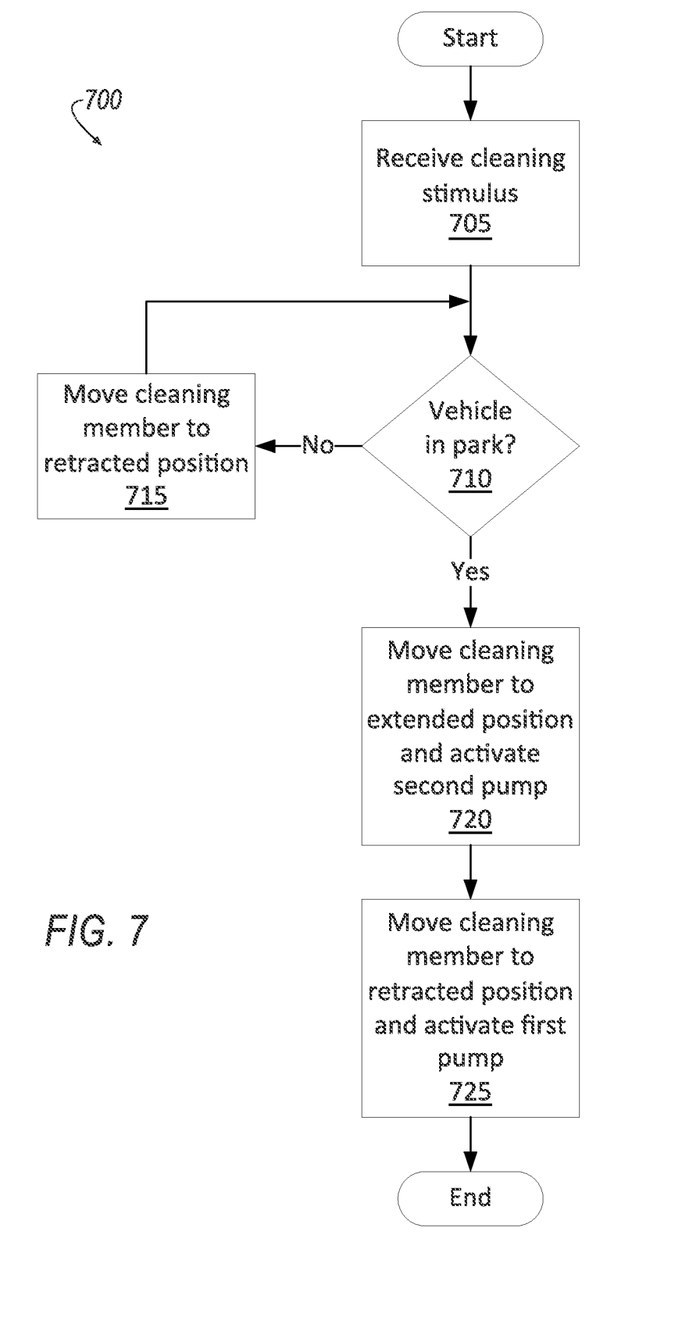
FIG. 7 is a process flow diagram of an example process for controlling the cleaning system.

FIG. 7 is a process flow diagram illustrating an exemplary process 700 for controlling the cleaning member 38. The memory of the controller 88 stores executable instructions for performing the steps of the process 700. As a general overview of the process 700, when the sensor window 36 needs cleaning and the vehicle 32 is in park, the controller 88 pumps detergent through the cleaning member 38 while moving the cleaning member 38 to the extended position, and then pumps water through the cleaning member 38 while moving the cleaning member 38 to the retracted position.

The process 700 begins in a block 705, in which the controller 88 receives a cleaning stimulus. A "cleaning stimulus" is any trigger that indicates that the sensor window 36 should be cleaned. For example, the controller 88 may receive a user command to perform cleaning of the sensor 42 or of another component of the vehicle 32 such as other sensors or a windshield. For another example, the controller 88 may determine whether debris is on the sensor window 36 based on data received from the sensor 42. The controller 88 may use known algorithms to determine that a swath of pixels in image data received from the sensor 42 is unchanging over time compared to the remainder of the pixels in the image data, suggesting that a portion of the field of view of the sensor 42 has been covered. For another example, a threshold time period may have elapsed since the last time the sensor window 36 was cleaned. The threshold time period may be chosen to be long enough that the sensor window 36 is likely to need to be cleaned.

Next, in a decision block 710, the controller 88 determines whether the vehicle 32 is in park. For example, the controller 88 may check for a status message received through the communications network 90 from another controller 88 in the vehicle 32 stating what gear the vehicle 32 is in, the speed of the vehicle 32, etc. If the gear of the vehicle 32 is not in park, or is shifted out of park, or is in motion, the process 700 proceeds to a block 715. If the vehicle 32 is in park, i.e., is stationary, the process 700 proceeds to a block 720.

In the block 715, the controller 88 moves or maintains the cleaning member 38 in the retracted position. The controller 88 instructs the motor 54 to move the cleaning member 38 to the retracted position if the cleaning member 38 is not already in the retracted position. After the block 715, the process 700 returns to the decision block 710 to continue monitoring for an appropriate time to clean the sensor window 36.

In the block 720, the controller 88 activates the second pump 62 while instructing the motor 54 to move the cleaning member 38 from the retracted position to the extended position. The cleaning member 38 is thus depositing detergent on the sensor window 36 while moving to the extended position.

Next, in a block 725, the controller 88 activates the first pump 60 while instructing the motor 54 to move the cleaning member 38 from the extended position to the retracted position. The cleaning member 38 is thus spraying water to remove the detergent and rinse the sensor window 36 while moving to the retracted position. The controller 88 may also simultaneously activate the air source 74 while instructing the motor 54 to move the cleaning member 38 from the extended position to the retracted position. The heated air from the air source 74 can cause the water to dry quickly. After the block 725, the process 700 ends.

The disclosure has been described in an illustrative manner, and it is to be understood that the terminology which has been used is intended to be in the nature of words of description rather than of limitation. The adjectives "first," "second," and "third" are used throughout this document as identifiers and are not intended to signify importance or order. "Substantially" as used herein means that a dimension, time duration, shape, or other adjective may vary slightly from what is described due to physical imperfections, power interruptions, variations in machining or other manufacturing, etc. Many modifications and variations of the present disclosure are possible in light of the above teachings, and the disclosure may be practiced otherwise than as specifically described.

What is claimed is:

1. An apparatus comprising:
    a base;
    a cylindrical sensor window fixed to the base, the base including a helical ran, wherein the cylindrical sensor window is configured to house a sensor within; and
    a helical cleaning member movable between a retracted position in the base and an extended position extending around the sensor window, the cleaning member including an outlet directed at the sensor window when the cleaning member is in the extended position, the cleaning member moving between the retracted position and the extended position by sliding along the rail.

2. The apparatus of claim 1, wherein the cleaning member includes a plurality of outlets including the outlet, and the outlets are directed at the sensor window when the cleaning member is in the extended position.

3. The apparatus of claim 2, wherein the cleaning member includes a tube fluidly coupled to the outlets.

4. The apparatus of claim 3, wherein the outlets are first outlets, the tube is a first tube, and the cleaning member includes a plurality of second outlets and a second tube fluidly coupled to the second outlets.

5. The apparatus of claim 4, further comprising a first pump fluidly coupled to the first tube, and a second pump fluidly coupled to the second tube.

6. The apparatus of claim 5, further comprising a controller communicatively coupled to the first pump and the second pump and programmed to activate the second pump while the cleaning member moves from the retracted position to the extended position.

7. The apparatus of claim 6, wherein the controller is further programmed to activate the first pump and instruct the cleaning member to move from the extended position to the retracted position, in response to an event.

8. The apparatus of claim 5, wherein the cleaning member includes a plurality of third outlets and a third tube fluidly coupled to the third outlets, the apparatus further comprising an air source disposed in the base and fluidly coupled to the third tube.

9. The apparatus of claim 8, wherein the air source is one of a blower or a compressor.

10. The apparatus of claim 4, further comprising a first reservoir fluidly coupled to the first tube and disposed in the base, and a second reservoir fluidly coupled to the second tube and disposed in the base.

11. The apparatus of claim 3, further comprising a reservoir fluidly coupled to the tube and disposed in the base.

12. The apparatus of claim 1, wherein the cleaning member has a helical shape of at least two complete revolutions.

13. The apparatus of claim 1, wherein the rail has a lead angle that is substantially equal to a lead angle of the cleaning member.

14. The apparatus of claim 1, further comprising a motor drivably coupled to the cleaning member and disposed in the base.

15. The apparatus of claim 14, further comprising a controller communicatively coupled to the motor and programmed to prevent the motor from moving the cleaning member from the retracted position to the extended position while a vehicle is in motion.

16. The apparatus of claim 14, further comprising a controller communicatively coupled to the motor and programmed to instruct the motor to move the cleaning member from the extended position to the retracted position in response to a vehicle gear shifting out of park.

17. The apparatus of claim 1, wherein the cleaning member includes a wiper blade directed radially inward, and the wiper blade contacts the sensor window when the cleaning member is in the extended position.

18. The apparatus of claim 17, wherein the wiper blade is elongated along the cleaning member.

19. The apparatus of claim 1, wherein the rail is integral with the base.

* * * * *

UNITED STATES PATENT AND TRADEMARK OFFICE
CERTIFICATE OF CORRECTION

PATENT NO.           : 11,084,464 B2                                        Page 1 of 1
APPLICATION NO.      : 16/242600
DATED                : August 10, 2021
INVENTOR(S)          : Jose Gerardo Velasco et al.

It is certified that error appears in the above-identified patent and that said Letters Patent is hereby corrected as shown below:

In the Claims

Claim 1, Line 39: Change "ran" to --rail--.

Signed and Sealed this
Twenty-first Day of September, 2021

Drew Hirshfeld
*Performing the Functions and Duties of the*
*Under Secretary of Commerce for Intellectual Property and*
*Director of the United States Patent and Trademark Office*